United States Patent
Watanabe

(10) Patent No.: US 7,525,092 B2
(45) Date of Patent: Apr. 28, 2009

(54) INFRARED SENSOR HAVING THERMO COUPLE

(75) Inventor: Kazuaki Watanabe, Nagoya (JP)

(73) Assignee: DENSO CORPORATION, Kariya (JP)

( * ) Notice: Subject to any disclaimer, the term of this patent is extended or adjusted under 35 U.S.C. 154(b) by 360 days.

(21) Appl. No.: 11/483,525

(22) Filed: Jul. 11, 2006

(65) Prior Publication Data

US 2007/0034799 A1   Feb. 15, 2007

(30) Foreign Application Priority Data

Jul. 25, 2005   (JP)   ............................. 2005-214863

(51) Int. Cl.
  *G01J 5/00*   (2006.01)
(52) U.S. Cl. .................................. 250/338.1
(58) Field of Classification Search ............... 250/338.1
  See application file for complete search history.

(56) References Cited

U.S. PATENT DOCUMENTS 5,393,351 A * 2/1995 Kinard et al. ............... 136/225
6,133,572 A * 10/2000 Cunningham .......... 250/339.03
6,300,554 B1 * 10/2001 Du et al. ...................... 136/201
6,550,324 B1 * 4/2003 Mayer et al. ............. 73/204.14
6,684,694 B2 * 2/2004 Fujiwara et al. .......... 73/204.26
2001/0040248 A1 * 11/2001 Toyoda ........................ 257/254
2002/0069909 A1 * 6/2002 Kubo .......................... 136/224

FOREIGN PATENT DOCUMENTS

JP           A-7-181082           7/1995

* cited by examiner

*Primary Examiner*—David P Porta
*Assistant Examiner*—Jessica L Eley
(74) *Attorney, Agent, or Firm*—Posz Law Group, PLC

(57) ABSTRACT

An infrared sensor includes a base plate having a membrane portion at the center thereof an a thick portion around the membrane, a thermocouple unit having a hot side contact member formed on the membrane portion and a cool side contact member formed on the thick portion, a heater formed near the thermocouple unit, a hot side thermo-sensitive resistor formed on the membrane portion and a cool side thermo-sensitive resistor formed on the thick portion. The heater, the hot side thermo-sensitive resistor and the cool side thermo-sensitive resistor are made of the same material as the hot side contact or the cool side contact. Therefore, additional manufacturing step is not necessary to form the heater and the resistors.

12 Claims, 3 Drawing Sheets

INFRARED SENSOR HAVING THERMO COUPLE

CROSS REFERENCE TO RELATED APPLICATION

The present application is based on and claims priority from Japanese Patent Application 2005-214863, filed Jul. 25, 2005, the contents of which are incorporated herein by reference.

BACKGROUND OF THE INVENTION

1. Field of the Invention

The present invention relates to an infrared sensor that is constituted of a substrate having a membrane and a thermo couple.

2. Description of the Related Art

JP-A-7-181082 discloses an infrared sensor that is constituted of a base plate having a membrane formed therein and a thermocouple unit located on the base plate. As shown in FIG. 6, the base plate 1 is constituted of a silicon substrate 1a, an insulation coating 2 formed on the silicon substrate 1a and an infrared radiation absorbing member 3. The central portion of the silicon substrate 1a is thinned by etching to form the membrane Ma. Such an infrared sensor detects an incident infrared radiation at the membrane Ma by the thermocouple unit T, which is so called a thermopile. The thermopile is constituted of a plurality of couples of thermocouple elements (e.g., Tm and Tn shown in FIG. 1) that are connected in series. Each couple of the thermocouple elements is constituted of a hot side contact Th and a cool side contact Tc and arranged to detect an electromotive force generated between the contacts Th and Tc. The hot side contact Th is disposed on the membrane Ma and the cool side contact is disposed on a portion of the silicon substrate 1a outside the membrane Ma, where the heat capacity is much larger than the heat capacity of the membrane. The infrared radiation absorbing member 3, which is made of a carbon-mixed resin, is disposed to cover the hot side contact Th. One thermocouple element is made of an aluminum film, and the other thermocouple element is made of a polycrystalline silicon film.

When the infrared radiation absorbing member 3 absorbs an infrared radiation, the temperature of the hot side contact Th, which is disposed on the membrane Ma, becomes much higher than the cool side contact Tc, because the membrane has much smaller heat capacity than the portion of the silicon substrate 1a outside the membrane Ma. The difference in temperature is detected by the thermocouple unit T, hence an amount of infrared radiation can be detected.

However, if no signal is provided by the infrared sensor although an infrared radiation may exist, it is difficult to know the cause of providing no signal although the cause may be a disconnection of the thermocouple or some other portion.

The infrared sensor disclosed in JP-A-7-181082 provides a diagnosis circuit that has a infrared ray radiating member under the cold side contact Tc. The infrared ray radiating member is occasionally energized to heat the cold side contact Tc to test the operation of the thermocouple unit T. However, it is almost impossible to carry out such a test until the infrared sensor has been assembled. In addition, the infrared ray radiating member necessitates additional manufacturing steps of the infrared sensor, resulting in production cost increase.

SUMMARY OF THE INVENTION

Therefore, an object of the invention is to provide an inexpensive infrared sensor that is easy to carry out an operation test before the sensor has been assembled.

According to a feature of the invention, an infrared sensor is constituted of a base plate having a membrane portion at the central portion thereof and a thick portion, a thermocouple unit having a hot side contact member formed on the membrane portion and a cool side contact member formed on the thick portion, a heater formed near the thermocouple unit, a hot side thermo-sensitive resistor formed on the membrane portion and a cool side thermo-sensitive resistor formed on the thick portion. With the above construction, the heater, the hot side thermo-sensitive resistor and the cool side thermo-sensitive resistor are made of the same material as one of the hot side contact and the cool side contact.

Therefore, additional manufacturing step is not necessary to form the heater and the resistors. Because the heater, the hot side thermo-sensitive resistor and the cool side thermo-sensitive resistor are formed at the same time the thermocouple unit is formed, a diagnosis test can be carried out as soon as the thermocouple unit is formed on a base plate. In addition, the Seebeck coefficient of the thermocouple unit can be accurately measured as the characteristics of the thermo-sensitive resistors can be adjusted. Therefore, the performance of the infrared sensor can be evaluated before the base plate is assembled.

The base plate preferably includes a silicon substrate and an insulation coating formed on the silicon substrate. The membrane portion may be formed by etching. The thermocouple unit may be a thermopile, and the hot side contact may be covered with an infrared radiation absorbing member. The heater is preferably formed on the membrane portion.

According to another feature of the invention, an infrared sensor includes a base plate having a rectangular membrane portion and a thick portion around the membrane, a thermocouple unit including a plurality of couples of thermocouple elements connected to generate electromotive force relative to an amount of infrared radiation on the membrane portion, a heater formed near the thermocouple unit, a hot side thermo-sensitive member formed on the membrane portion and a cool side thermo-sensitive member formed on the thick portion. With the above construction, at least one of the heater, hot side thermo-sensitive member and cool side thermo-sensitive member is made of the same material as one of the couple of thermocouple elements.

The couples of thermocouple elements are divided into four groups of couples of thermocouple elements respectively disposed along four sides of the rectangular membrane portion; and the hot side thermo-sensitive member comprises four thermo-sensitive resistors connected in series to each other and respectively disposed near the four groups of couples of thermocouple elements.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Various embodiments of the present invention will be described with reference to the appended drawings.

Figure 1:
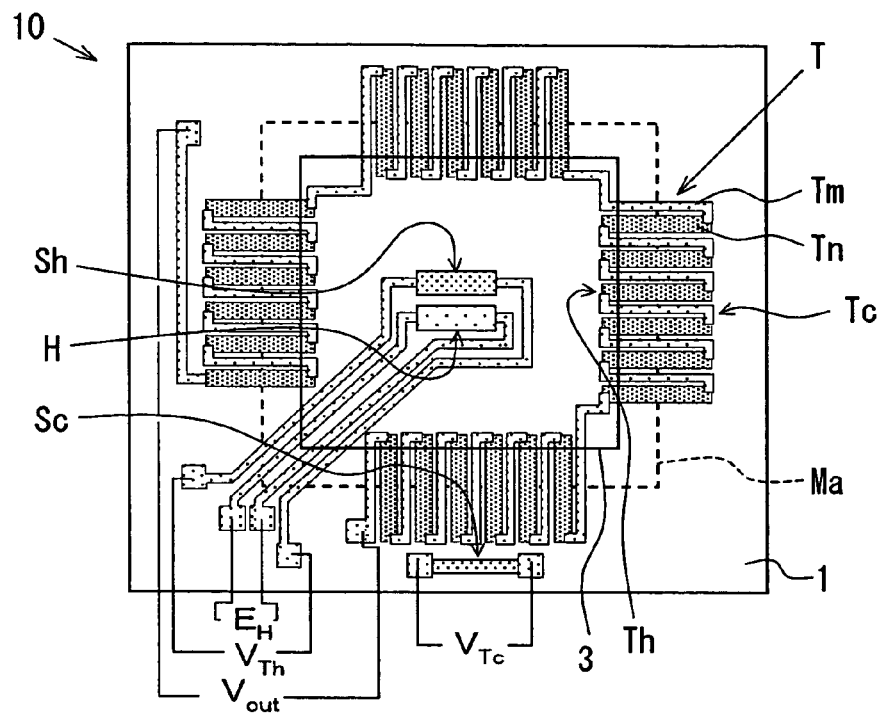
FIG. 1 is a plan view illustrating an infrared sensor according to the first embodiment of the invention.

An infrared sensor according to the first embodiment of the invention will be described with reference to FIG. 1.

The infrared sensor 10 is constituted of a base plate 1 having a membrane portion Ma and a thermocouple unit T, a heater H, a hot-side thermo-sensitive resistor Sh and a cool side thermo-sensitive resistor Sc. The base plate 1 is constituted of a silicon substrate 1a and an insulation coating 2.

The membrane portion Ma is formed to be generally square and located at the central portion of the silicon substrate by means of an etching. Incidentally, the insulation coating 2 may be omitted or replaced with the membrane Ma, and the outline of the membrane Ma may be rectangular, circular or elliptic.

The thermocouple unit T is a thermopile that has a plurality of couples of the thermocouple elements Tm, Tn, which are formed on the base plate 1 along the periphery of the membrane portion Ma and connected in series to each other to provide an output voltage Vout. The thermocouple element Tm is made of an aluminum film, and the thermocouple element Tn is made of a polycrystalline silicon film. Each couple of the thermocouple elements Tm, Tn has a hot side contact Th disposed at a portion of the Membrane portion and a cool side contact Tc disposed at a portion outside the membrane portion Ma. An infrared radiation absorbing member 3, which is made of a carbon-mixed resin, is disposed to cover all the hot side contacts Th.

The heater H and the hot side thermo-sensitive resistor Sh are located at the center of the membrane portion Ma. On the other hand, the cool side thermo-sensitive resistor Sc is located outside the membrane Ma near some cool side contact Tc. The heater H, the hot side thermo-sensitive resistor Sh and the cool side thermo-sensitive resistor Sc are made of the same material as one of the thermocouple elements Tm or Tn. That is, the heater H, the hot side thermo-sensitive resistor Sh and the cool side thermo-sensitive resistor Sc are formed of an aluminum film or a polycrystalline silicon film when the thermocouple unit is formed.

Each of the heater H, the hot side thermo-sensitive resistor Sh and the cool side thermo-sensitive resistor Sc has a pair of terminals. When a test is carried out, a voltage $E_H$ is applied across the terminals to heat the membrane Ma. Thereafter, constant current of voltage $V_{TH}$, $V_{TC}$ is supplied to the thermo-sensitive resistors Sh, Sc to measure voltage drops thereof, which are converted into a temperature difference between two portions where the hot side and cool side thermo-sensitive resistors Sh, Sc are respectively located.

Therefore, it is easy to test the operating condition of the infrared sensor. In addition, it is possible to carry out such a test before the infrared sensor has been assembled. Such a heater and thermo-resistive resistances, which are made of the same material as the thermocouple elements, do not necessitate additional manufacturing steps. The infrared radiation absorbing member 3 may be omitted under some circumstances.

Figure 2:
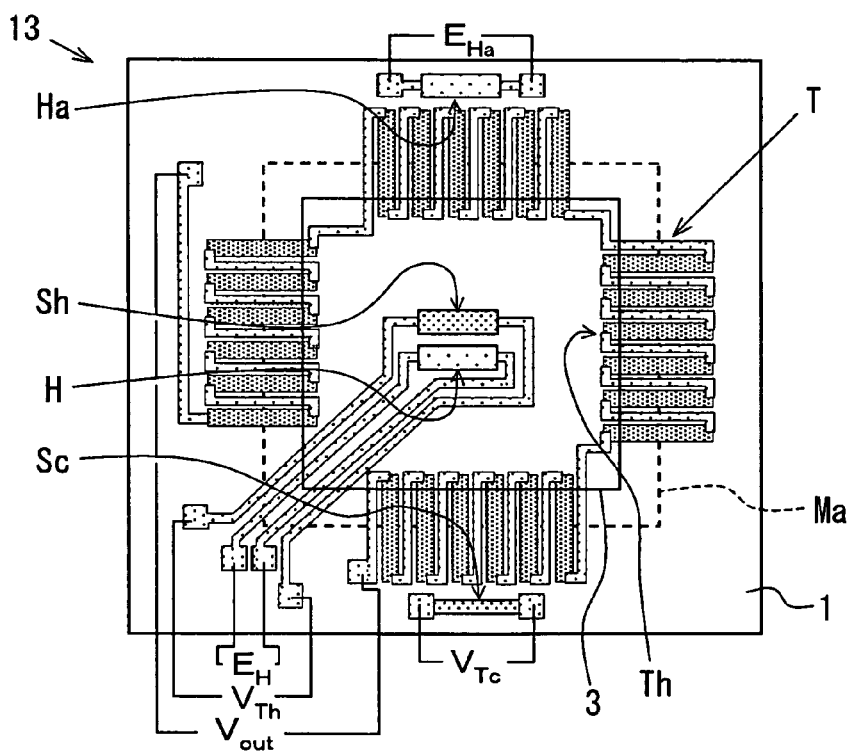
FIG. 2 is a plan view illustrating an infrared sensor according to the second embodiment of the invention.

An infrared sensor according to the second embodiment of the invention has an additional heater Ha, which is made of the same material as one of the thermocouple elements Tm or Tn, outside the membrane Ma, as shown in FIG. 2. However, it is possible to omit the heater H located in the membrane Ma under some circumstances.

Figure 3:
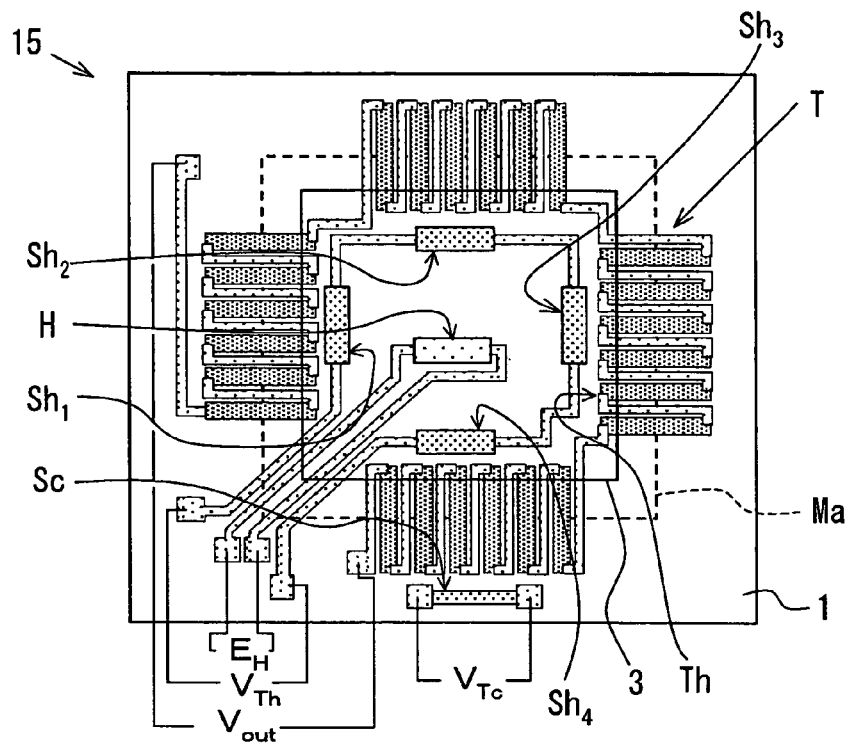
FIG. 3 is a plan view illustrating an infrared sensor according to the third embodiment of the invention.

An infrared sensor according to the third embodiment of the invention has series-connected four hot side thermo-sensitive resistors Sh1, Sh2, Sh3, Sh4, formed near the hot side contacts Th that are located along four sides of square membrane Ma as shown in FIG. 3. Therefore, it is possible to measure more accurate temperature of the hot side contacts of the respective thermocouple elements. However, the four hot side thermo-resistive resistors Sh1, Sh2, Sh3, Sh4 can be replaced with a single hot side contact formed near the hot side contacts Th that are located one side of the square membrane Ma.

Figure 4:
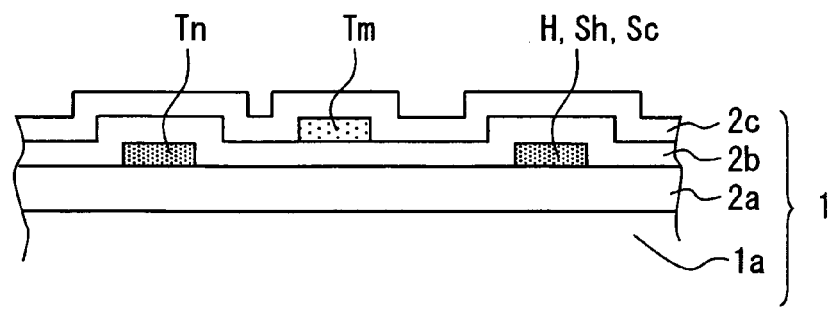
FIG. 4 is a schematic cross-sectional side view of a base plate of an infrared sensor according to the invention.

As shown in FIG. 4, the base plate 1 of the infrared sensor 10 is constituted of a plurality of insulation coatings 2a, 2b and 2c formed on the silicon substrate 1a. The insulation coating 2a is directly formed on the silicon substrate 1a to carry polycrystalline silicon patterns of the thermocouple elements Tn, the heater H, the hot side thermo-sensitive resistor Sh and the cool side thermo-sensitive resistor Sc. The insulation coating 2b carries a aluminum pattern of the thermocouple elements Tm and wires for connecting the thermocouple unit T, the heater H, the hot side thermo-sensitive resistance Sh and the cool side thermo-sensitive element Sc. The insulation coating 2b has contact holes through which the electrical connection of both of the patterns is made. The insulation coating 2c covers and protects the aluminum pattern.

Figure 5:
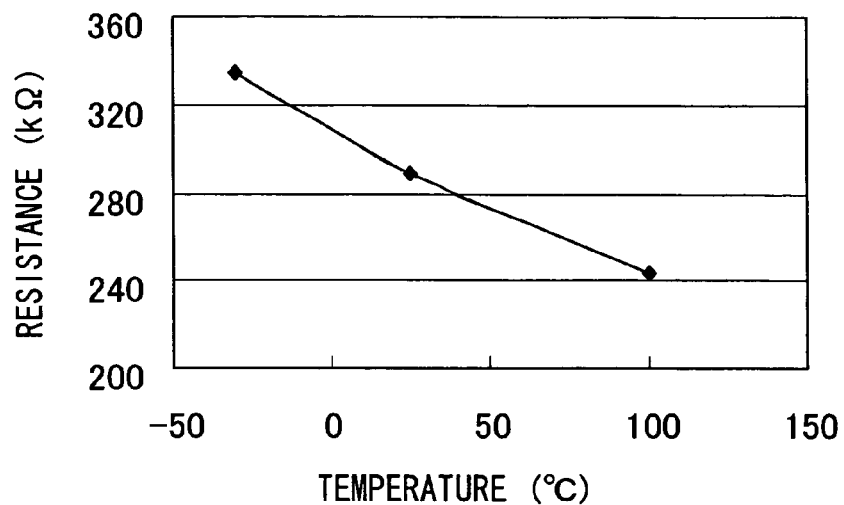
FIG. 5 is a graph showing a characteristic curve of a thermo-sensitive resistor for use in an infrared sensor according to the invention.
Figure 6:
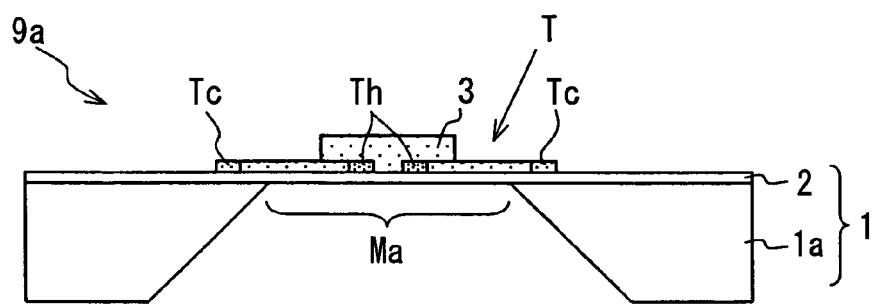
FIG. 6 is a schematic cross-sectional side view of a prior art infrared sensor.

Each of the hot side thermo-sensitive resistor Sh and the cool side thermo-sensitive resistor Sc has a negative temperature coefficient. A preferable temperature characteristic of the hot side thermo-sensitive resistor Sh and the cool side thermo-sensitive resistor Sc is shown in FIG. 5.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An infrared sensor comprising:

a base plate having a membrane portion and a thick portion;

a thermocouple unit having a hot side contact member formed on the membrane portion and a cool side contact member formed on the thick portion, said thermocouple unit generating electromotive force, thereby detecting infrared radiation on said membrane portion;

a heater formed near said thermocouple unit, wherein the heater has a pair of input terminals to which test voltage is applied to heat a portion of said thermocouple unit;

a hot side thermo-sensitive resistor formed on said membrane portion, wherein the hot side thermo-sensitive resistor has a pair of input terminals to which an amount of current is supplied from outside to measure a voltage drop thereof when the test voltage is applied to the heater; and a cool side thermo-sensitive resistor formed on said thick portion, wherein the cool side thermo-sensitive resistor has a pair of input terminals to which an amount of current is supplied from outside to measure a voltage drop thereof when the test voltage is applied to the heater, and wherein said heater, hot side thermo-sensitive resistor and cool side thermo-sensitive resistor are made of the same material as one of the hot side contact member and the cool side contact member.

2. The infrared sensor as claimed in claim 1, wherein:

said base plate comprises a silicon substrate and an insulation coating formed on said silicon substrate; and said membrane portion comprises a portion of said silicon substrate thinned by etching.

3. The infrared sensor as claimed in claim 1, wherein said thermocouple unit comprises a thermopile.

4. The infrared sensor as claimed in claim 1, further comprising an infrared radiation absorbing member covering said hot side contact member.

5. The infrared sensor as claimed in claim 1, wherein said heater is formed on said membrane portion.

6. The infrared sensor as claimed in claim 5, wherein:

said membrane portion has a square periphery;

said hot side contact member is disposed near said square periphery; and said heater is disposed near the center of said membrane portion.

7. The infrared sensor as claimed in claim 6, wherein: said hot side thermo-sensitive resistor is disposed near said hot side contact member.

8. An infrared sensor comprising:

a base plate having a rectangular membrane portion at a central portion thereof and a thick portion around said membrane;

a thermocouple unit including a plurality of series-connected couples of thermocouple elements, each of said couples having a hot side contact formed on a portion of said rectangular membrane along one side thereof and a cool side contact formed on a portion of the thick portion;

a heater formed near said thermocouple unit, wherein the heater is energized to heat a portion of the thermocouple unit;

a hot side thermo-sensitive member formed on said membrane portion, wherein the hot side thermo-sensitive member has a pair of input terminals to which an amount of current is supplied from outside to measure a voltage drop thereof when the heater is energized; and a cool side thermo-sensitive member formed on said thick portion, wherein the cool side thermo-sensitive member has a pair of input terminals to which an amount of current is supplied from outside to measure a voltage drop thereof when the heater is energized wherein at least one of said heater, hot side thermo-sensitive member and cool side thermo-sensitive member is made of the same material as one of the couple of thermocouple elements.

9. The infrared sensor as claimed in claim 8, wherein:

said thermocouple unit comprises four groups of couples of thermocouple elements, each of which is disposed along one of the four sides of said rectangular membrane portion; and said hot side thermo-sensitive member comprises four thermo-sensitive resistors connected in series to each other so that each of said four thermo-sensitive resistors can be disposed along one of said four groups of couples of thermocouple elements.

10. The infrared sensor as claimed in claim 9, wherein one of said couple of thermocouple elements is made of aluminum and the other is made of polycrystalline silicon.

11. The infrared sensor as claimed in claim 10, wherein said hot side thermo-sensitive member and cool side thermo-sensitive member are made of polycrystalline silicon.

12. The infrared sensor as claimed in claim 9, wherein said hot side thermo-sensitive member and cool side thermo-sensitive member are made of the same material as one of the couple of thermocouple elements.

* * * * *